United States Patent
Zirin et al.

(10) Patent No.: US 9,246,373 B2
(45) Date of Patent: Jan. 26, 2016

(54) COOLING ASSEMBLY FOR ELECTRICAL MACHINES AND METHODS OF ASSEMBLING THE SAME

(71) Applicant: General Electric Company, Schenectady, NY (US)

(72) Inventors: Robert M. Zirin, Niskayuna, NY (US); Kiruba Sivasubramaniam Haran, Clifton Park, NY (US); Michael John Douglass, Amsterdam, NY (US); Rammohan Rao Kalluri, Munich (DE)

(73) Assignee: General Electric Company, Niskayuna, NY (US)

( * ) Notice: Subject to any disclaimer, the term of this patent is extended or adjusted under 35 U.S.C. 154(b) by 353 days.

(21) Appl. No.: 13/665,195

(22) Filed: Oct. 31, 2012

(65) Prior Publication Data
US 2014/0117794 A1    May 1, 2014

(51) Int. Cl.
*H02K 3/24* (2006.01)
*H02K 15/04* (2006.01)
*H02K 7/18* (2006.01)
*H02K 9/19* (2006.01)
*H02K 9/22* (2006.01)

(52) U.S. Cl.
CPC .............. *H02K 15/04* (2013.01); *H02K 3/24* (2013.01); *H02K 7/1838* (2013.01); *H02K 9/19* (2013.01); *H02K 9/22* (2013.01); *Y10T 29/49009* (2015.01)

(58) Field of Classification Search
CPC .................................. H02K 3/24; H02K 9/22
USPC ................ 310/52, 54, 58, 59, 60 R, 64
See application file for complete search history.

(56) References Cited

U.S. PATENT DOCUMENTS

| | | | |
|---|---|---|---|
| 2,727,161 A | 12/1955 | Kilner et al. | |
| 2,873,393 A | 2/1959 | Baudry | |
| 3,189,769 A | 6/1965 | Willyoung | |
| 3,624,432 A * | 11/1971 | Merz | 310/53 |
| 4,152,610 A | 5/1979 | Wallenstein | |
| 4,308,476 A | 12/1981 | Schuler | |
| 4,900,956 A | 2/1990 | Gavilondo et al. | |
| 4,994,700 A | 2/1991 | Bansal et al. | |
| 5,329,197 A | 7/1994 | Kudlacik | |
| 5,477,095 A | 12/1995 | Kleinburger et al. | |
| 6,798,105 B1 | 9/2004 | Nilson | |
| 2004/0070288 A1 * | 4/2004 | Seki et al. | 310/12 |
| 2004/0130223 A1 * | 7/2004 | Nimz et al. | 310/58 |
| 2006/0043801 A1 * | 3/2006 | Adra | 310/54 |
| 2010/0102651 A1 | 4/2010 | Mohle et al. | |
| 2010/0181849 A1 | 7/2010 | Lindh et al. | |
| 2011/0309695 A1 * | 12/2011 | Huard | 310/46 |

FOREIGN PATENT DOCUMENTS

GB    1321558    6/1973

* cited by examiner

*Primary Examiner* — Hanh Nguyen
(74) *Attorney, Agent, or Firm* — Nitin N. Joshi

(57) ABSTRACT

An assembly for cooling an electrical coil winding having a first coil, a second coil, a first end turn and a second end turn is provided. The assembly includes a supply header; a return header; and a plurality of flow members coupled in flow communication to the supply header and the return header. The flow members are configured to channel a flow agent from supply header to the return header. Each the flow member of the plurality of flow members includes a first portion coupled to the first coil; a second portion coupled to the second coil; a first end portion coupled to the first end turn and coupled in flow communication to the first portion and the second portion; and a second end portion coupled to the second end turn and coupled in flow communication to the second portion.

18 Claims, 13 Drawing Sheets

COOLING ASSEMBLY FOR ELECTRICAL MACHINES AND METHODS OF ASSEMBLING THE SAME

BACKGROUND OF THE DISCLOSURE

The embodiments described herein relate generally to electrical machines, and more particularly, to methods and systems for cooling electrical machines.

Some electrical machines, such as generators or motors, can have a rotor, a stationary stator and associated windings. The use of windings in some electrical machines can result in an increase in generated electromagnetic forces and an increase in flux densities within the machines. The power density of electrical machines, however, can be limited by the maximum operating temperature of the windings. The current density and thus the specific power of these machines can be increased, and the efficiency of the machine can also be increased by the use of coolers.

Conventional generators may include high power, forced-air cooling systems. Forced-air cooling systems, however, may include bulky, large and costly equipment such as, for example, blowers and/or refrigeration systems and/or multiple heat exchangers; i.e., a water-to-air heat exchanger to cool the blower air and an air-to-water heat exchanger to cool the water from the first heat exchanger. Besides sometimes being unwieldy and fault-prone, these components may not fit within operational housings such as, for example, nacelles of wind turbines.

Some generators may also include liquid cooling systems. Liquid cooling systems, however, may increase eddy current flow along the liquid cooling tubes which can decrease the efficiency of the generator. Moreover, some liquid cooling systems couple the cooling tubes to the coil former, which can be an inefficient arrangement for heat transfer, since the liquid cooling tubes are not coupled to the heat generating coil windings.

BRIEF DESCRIPTION OF THE DISCLOSURE

In one aspect, an assembly for cooling an electrical coil winding having a first coil, a second coil, a first end turn and a second end turn is provided. The assembly includes a supply header; a return header; and a plurality of flow members coupled in flow communication to the supply header and the return header. The flow members are configured to channel a flow agent from supply header to the return header. Each flow member of the plurality of flow members includes a first portion coupled to the first coil; a second portion coupled to the second coil; a first end portion coupled to the first end turn and coupled in flow communication to the first portion and the second portion; and a second end portion coupled to the second end turn and coupled in flow communication to the second portion.

In another aspect, an electrical machine is provided. The electrical machine includes a stator having a coil former and a coil winding coupled to the coil former, the coil winding includes a coil, a first end turn and a second end turn. The electrical machine further includes a flow assembly coupled to the coil former. The flow assembly includes a plurality of flow members coupled to the coil and configured to channel a flow agent from supply header to the return header. Each flow member of the plurality of flow members includes a first portion coupled to the coil; a second portion coupled to the coil; a first end portion coupled to the first end turn and coupled in flow communication to the first portion and the second portion; and a second end portion coupled to the second end turn and coupled in flow communication to the second portion.

In another aspect, a method of assembling an electrical machine is provided. The method includes coupling a coil winding to a coil former; coupling a flow member to the coil winding in a serpentine pattern; coupling a first portion of the flow member to a first coil of the coil winding; and coupling a second portion of the flow member to a second coil of the coil winding.

DETAILED DESCRIPTION OF THE DISCLOSURE

The embodiments described herein relate to electrical machines and methods of cooling the electrical machines. More particularly, the embodiments relate to a flow assembly that is configured to facilitate cooling the electrical machine. It should be understood that the embodiments described herein for electrical machines are not limited to generators, and should be further understood that the descriptions and figures that utilize a generator and a wind turbine are exemplary only.

Figure 1:
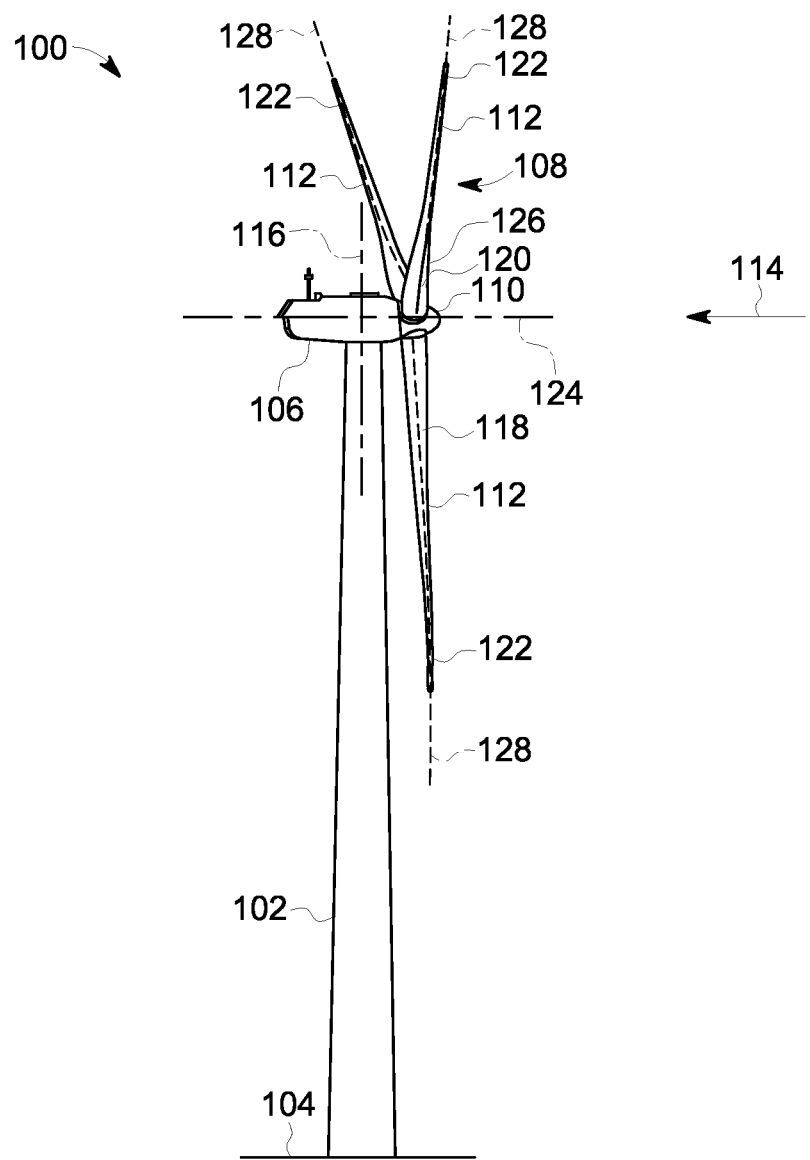
FIG. 1 is perspective view of an exemplary wind turbine.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. In the exemplary embodiment, wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a rotor 108 is coupled to nacelle 106. Rotor 108 includes a rotatable hub 110 and a plurality of rotor blades 112 coupled to hub 110. In the exemplary embodiment, rotor 108 includes three rotor blades 112. Alternatively, rotor 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating rotor 108, thereby transferring kinetic energy from wind 114 into usable mechanical energy, and subsequently, electrical energy. Rotor 108 and nacelle 106 are rotated about tower 102 on a yaw axis 116 to control a perspective of rotor blades 112 with respect to a direction of wind 114. Rotor blades 112 are mated to hub 110 by coupling a rotor blade root portion 118 to hub 110 at a plurality of load transfer regions 120. Load transfer regions 120 each have a hub load transfer region and a rotor blade load transfer region (both not shown in FIG. 1). Loads induced to rotor blades 112 are transferred to hub 110 via load transfer regions 120. Each rotor blade 112 also includes a rotor blade tip portion 122.

In the exemplary embodiment, rotor blades 112 have a length of between approximately 30 meters (m) (99 feet (ft)) and approximately 120 m (394 ft). Alternatively, rotor blades 112 may have any suitable length that enables wind turbine 100 to function as described herein. For example, rotor blades 112 may have a suitable length less than 30 m or greater than 120 m. As wind 114 contacts rotor blade 112, lift forces are induced to rotor blade 112 and rotation of rotor 108 about an axis of rotation 124 is induced as rotor blade tip portion 122 is accelerated.

A pitch angle (not shown) of rotor blades 112, i.e., an angle that determines the perspective of rotor blade 112 with respect to the direction of wind 114, may be changed by a pitch assembly (not shown in FIG. 1). More specifically, increasing a pitch angle of rotor blade 112 decreases an amount of rotor blade surface area 126 exposed to wind 114 and, conversely, decreasing a pitch angle of rotor blade 112 increases an amount of rotor blade surface area 126 exposed to wind 114. The pitch angles of rotor blades 112 are adjusted about a pitch axis 128 at each rotor blade 112. In the exemplary embodiment, the pitch angles of rotor blades 112 are controlled individually.

Figure 2:
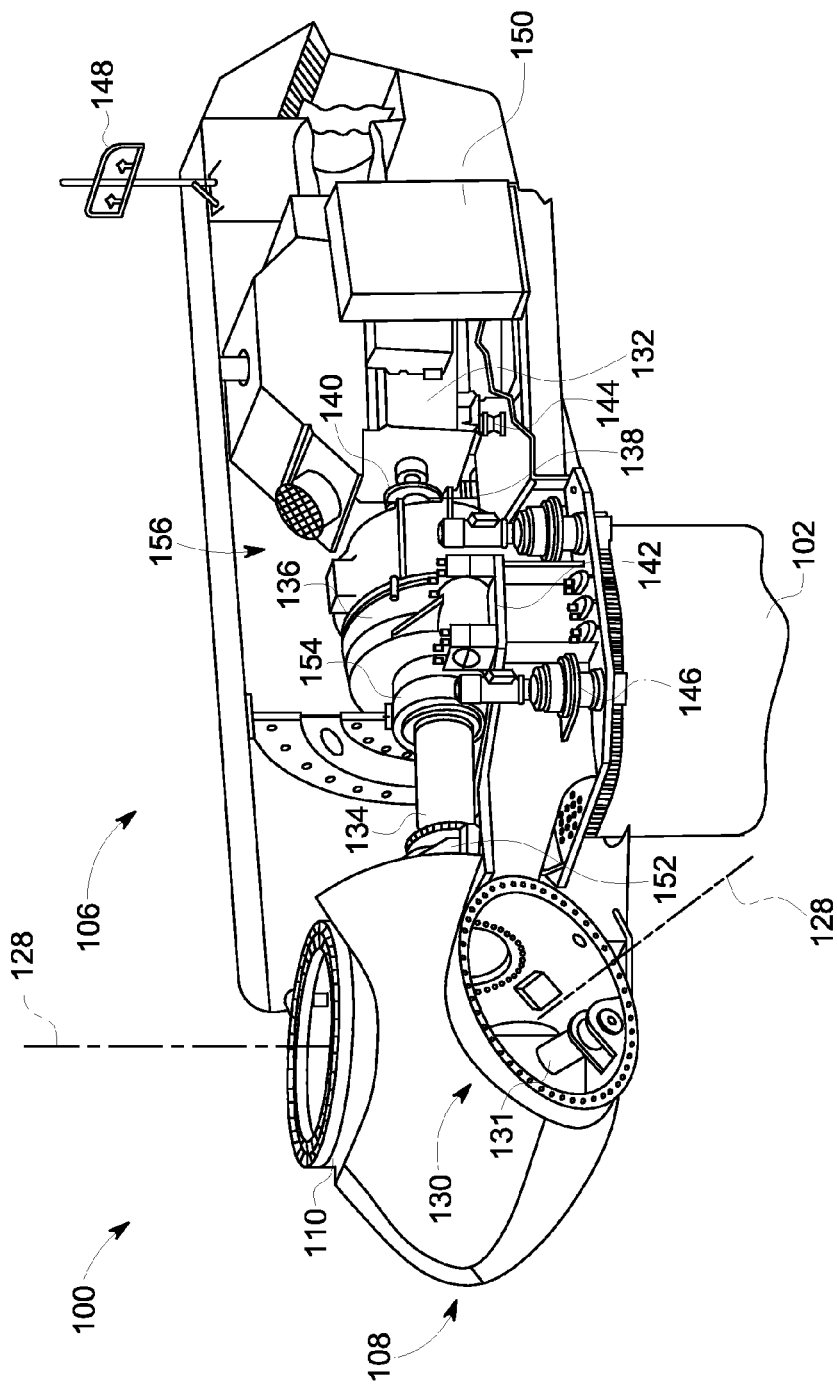
FIG. 2 is a partial sectional view of an exemplary electrical machine within a nacelle used with the wind turbine shown in FIG. 1.

FIG. 2 is a partial sectional view of nacelle 106 used with wind turbine 100. In the exemplary embodiment, various components of wind turbine 100 are housed in nacelle 106. For example, in the exemplary embodiment, nacelle 106 includes pitch assemblies 130. Each pitch assembly 130 is coupled to an associated rotor blade 112 (shown in FIG. 1), and modulates a pitch of an associated rotor blade 112 about pitch axis 128. In the exemplary embodiment, each pitch assembly 130 includes at least one pitch drive motor 131.

Moreover, in the exemplary embodiment, rotor 108 is rotatably coupled to an electrical machine 132, for example a generator, positioned within nacelle 106 via a rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138. High speed shaft 138 rotatably drives generator 132 via coupling 140 and rotation of high speed shaft 138 facilitates production of electrical power by generator 132. Gearbox 136 is supported by a support 142 and generator 132 is supported by a support 144. In the exemplary embodiment, gearbox 136 uses a dual path geometry to drive high speed shaft 138. Alternatively, rotor shaft 134 may be coupled directly to generator 132 via coupling 140.

Nacelle 106 also includes a yaw drive mechanism 146 that rotates nacelle 106 and rotor 108 about yaw axis 116 to control the perspective of rotor blades 112 with respect to the direction of wind 114. Nacelle 106 also includes at least one meteorological mast 148 that in one embodiment, includes a wind vane and anemometer (neither shown in FIG. 2). In one embodiment, meteorological mast 148 provides information, including wind direction and/or wind speed, to a turbine control system 150. Turbine control system 150 includes one or more controllers or other processors configured to execute control algorithms. As used herein, the term "processor" includes any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term processor. Moreover, turbine control system 150 may execute a SCADA (Supervisory, Control and Data Acquisition) program.

Pitch assembly 130 is operatively coupled to turbine control system 150. In the exemplary embodiment, nacelle 106 also includes forward support bearing 152 and aft support bearing 154. Forward support bearing 152 and aft support bearing 154 facilitate radial support and alignment of rotor shaft 134. Forward support bearing 152 is coupled to rotor shaft 134 near hub 110. Aft support bearing 154 is positioned on rotor shaft 134 near gearbox 136 and/or generator 132. Nacelle 106 may include any number of support bearings that enable wind turbine 100 to function as disclosed herein. Rotor shaft 134, generator 132, gearbox 136, high speed shaft 138, coupling 140, and any associated fastening, support, and/or securing device including, but not limited to, support 142, support 144, forward support bearing 152, and aft support bearing 154, are sometimes referred to as a drive train 156.

Figure 3:
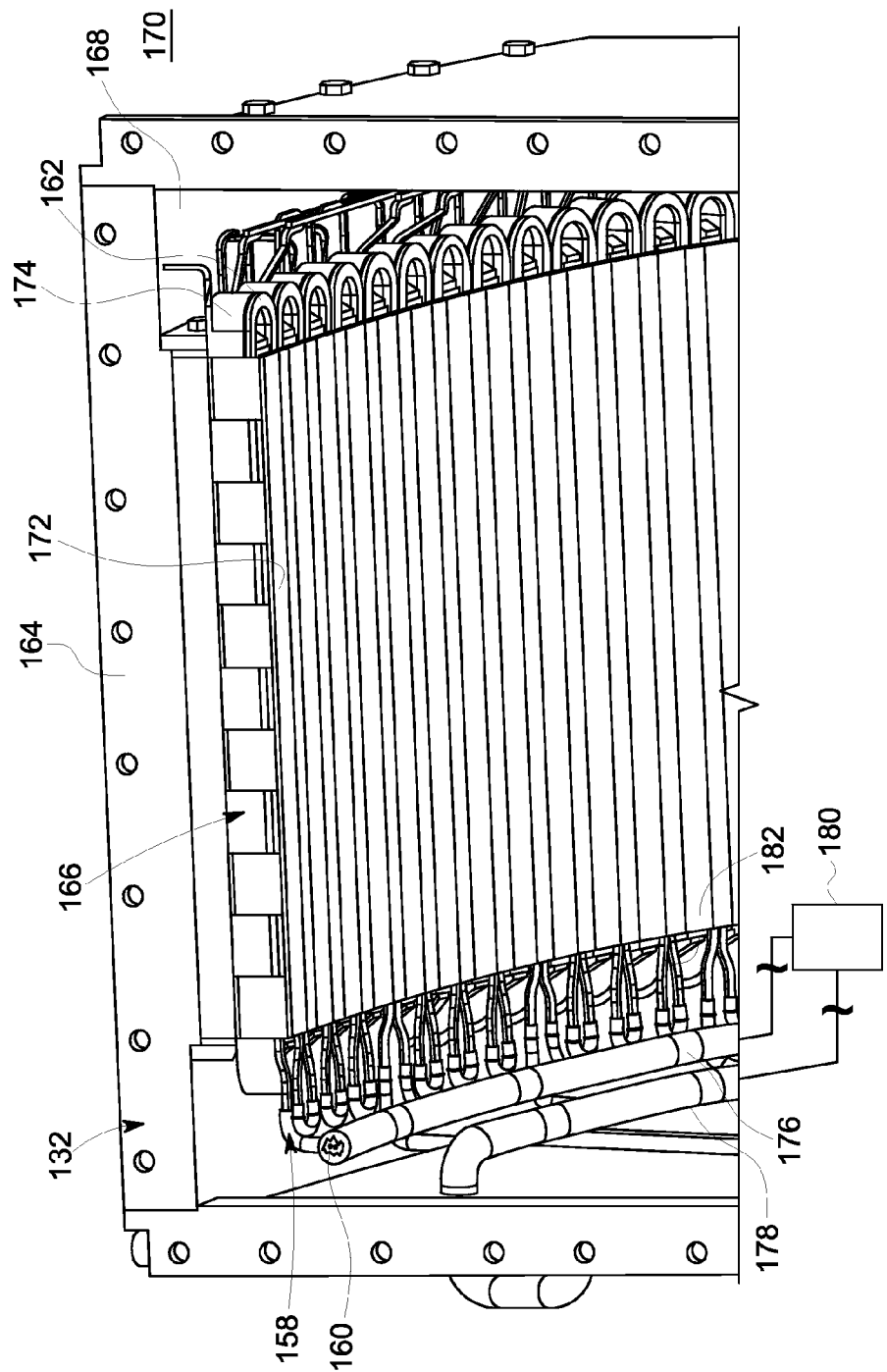
FIG. 3 is a cross sectional view of the electrical machine shown in FIG. 2 and an exemplary cooling assembly coupled to the electrical machine.

FIG. 3 is a cross sectional view of electrical machine 132 and a cooling assembly 158 coupled to electrical machine 132. Cooling assembly 158 is configured to maintain a cooling agent 160 at pre-determined temperatures and move cooling agent 160 though a cooling loop 162 that is coupled in thermal communication to electrical machine 132. Cooling agent 160 includes fluids such as, but not limited to, 50% Ethylene-Glycol-water solution, water, air, helium, and combinations thereof. Alternatively, cooling agent 160 can include any composition that enables cooling of electrical machine 132. Cooling assembly 158 includes a closed system, however, additional cooling agent 160 can be added to maintain required pressure and/or volume in cooling loop 162.

Electrical machine 132 includes an assembly housing 164, a stationary assembly 166, and a rotatable assembly (not shown). Housing 164 defines an interior 168 and an exterior 170 of electrical machine 132 and is configured to at least partially enclose and protect stationary assembly 166 and rotatable assembly. Stationary assembly 166 includes a stator 172, which includes a plurality of stator teeth (not shown) and a plurality of coil windings 174 wound around stator teeth and adapted to be electronically energized to generate an electromagnetic field. In the exemplary embodiment, a variable frequency drive (not shown) provides a signal, for example, a pulse width modulated (PWM) signal, to electrical machine 132. In an alternative embodiment, electrical machine 132 may include a controller (not shown) coupled to windings 174 and configured to apply a voltage to one or more of windings 174 at a time for commutating windings 174 in a preselected sequence to rotate rotatable assembly about an axis of rotation.

In an exemplary embodiment, stationary assembly 166 is a three phase concentrated wound stator formed from a stack of laminations (not shown) made of a magnetically permeable material. While stationary assembly 166 is illustrated for purposes of disclosure, it is contemplated that other stationary assemblies of various other constructions having different shapes and with different numbers of teeth may be utilized.

Windings 174 are commutated without brushes by sensing the rotational position of rotatable assembly as it rotates within stator 172 and utilizing electrical signals generated as a function of the rotational position of rotatable assembly sequentially to apply a voltage to each of windings 174 in different preselected orders or sequences that determine the direction of the rotation of rotatable assembly. Position sensing may be accomplished by a position-detecting circuit (not shown) responsive to the back electromotive force (EMF) to provide a simulated signal indicative of the rotational position of rotatable assembly to control the timed sequential application of voltage to windings 174 of stationary assembly 166. Other means of position sensing may also be used.

Cooling assembly 158 includes a supply header 176, a return header 178, a heat exchanger 180 and a plurality of flow members 182 coupled in flow communication to supply header 176 and return header 178. The plurality of flow members 182 are configured to channel cooling agent 160 from supply header 176 and to return header 178. Heat exchanger 180 is configured to change the temperature of cooling agent 160 between supply header 176 and return header 178. In the exemplary embodiment, heat exchanger 180 is configured to reduce the temperature of cooling agent 160 from return header 178 to supply header 176. Alternatively, heat exchanger 180 can be configured to increase the temperature of cooling agent 160 from return header 178 to supply header 176. Flow members 182 include heat transferring materials such as, but not limited to, metals and alloys. Moreover, flow members 182 include materials that are configured to reduce and/or eliminate eddy current flow. In the exemplary embodiment, flow members 182 include stainless steel materials. Alternatively, flow members 182 can include any material to enable flow members 182 to function as described herein.

Figure 4:
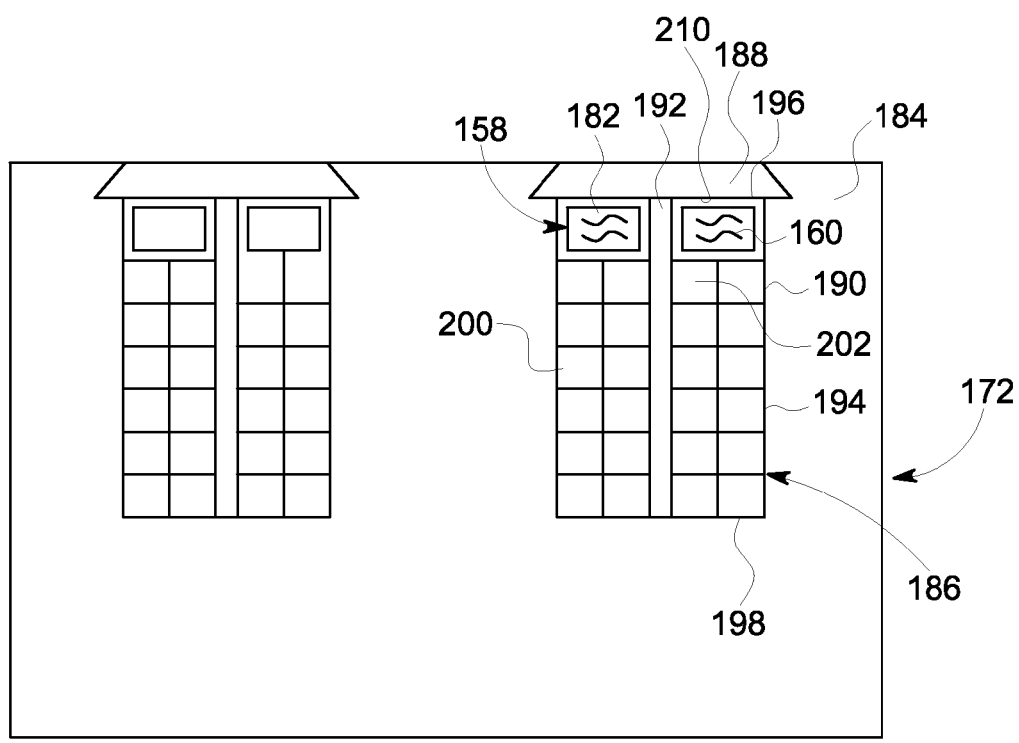
FIG. 4 is a schematic view of the exemplary cooling assembly coupled to a stator of the electrical machine shown in FIG. 2.
Figure 5:
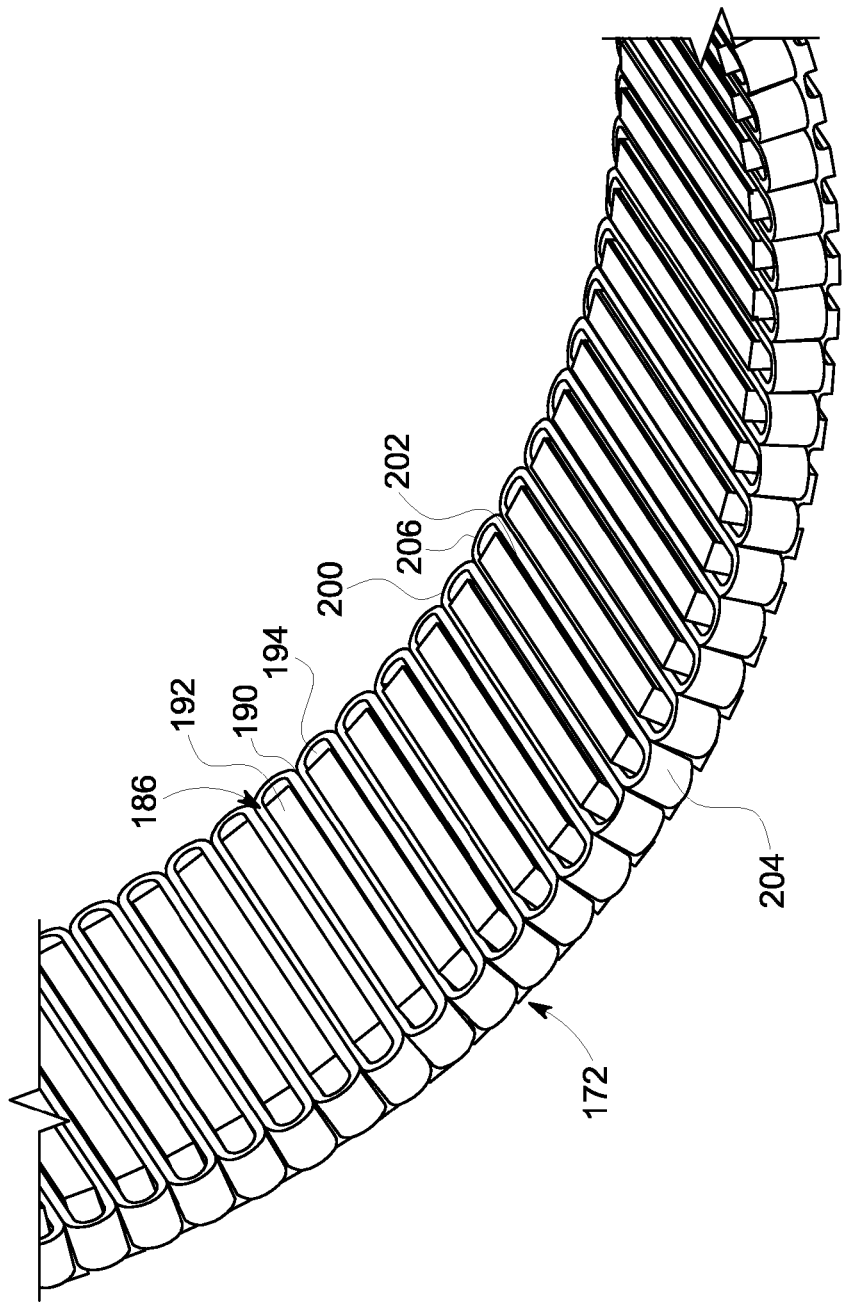
FIG. 5 is a perspective view of a coil former and a coil winding of the stator shown in FIG. 4.

FIG. 4 is a schematic view of cooling assembly 158 coupled to stator 172 which includes a coil former 184, a coil winding 186, and a wedge 188. FIG. 5 is a perspective view of coil former 184 and coil winding 186. Coil former 184 includes a recess 190 that is sized and shaped to receive coil winding 186. In the exemplary embodiment, recess 190 is oval shaped known as a racetrack configuration. Alternatively, recess 190 can include any shape to accept coil winding 186. Coil winding 186 includes a winding block 192 and conducting coil 194. More particularly, conducting coil 194 includes strip-shaped conductors of low temperature and/or high temperature materials which are coupled radially inward within winding block 192.

Coil winding 186 includes a first side 196 and a second side 198. Moreover, conducting coil 194 includes a first coil 200, a second coil 202, a first end turn 204 and a second end turn 206. First and second coils 200, 202 are positioned within recess 190 wherein first end turn 204 and second end turn 206 extend beyond winding block 192. In the exemplary embodiment, flow members 182 are coupled in thermal communication to first coil 200 and second coil 202 at first side 196. Wedge 188 is configured to couple to coil former 184 to facilitate coupling flow members 182 to first side 196. More particularly, wedge 188 is configured to apply a pressure against at least flow members 182 and coil winding 186.

In the exemplary embodiment, flow members 182 are positioned within recess 190 and include a rectangular cross sectional shape which is configured to maximize surface contact of flow members 182 with first coil 200 and second coil 202 to facilitate increasing heat transfer between first and second coils 200, 202 and cooling agent 160 that is present in flow members 182. Moreover, rectangular cross sectional shape is configured to match the shape of recess 190 and/or a wedge side 210 to facilitate positioning flow members 182 within recess 190 and between wedge 188 and coil winding 186. Alternatively, flow members 182 can include other cross sectional shapes such as, but not limited to, circular. Flow members 182 can include any cross sectional shape to enable cooling assembly 158 to function as described herein.

Figure 6:
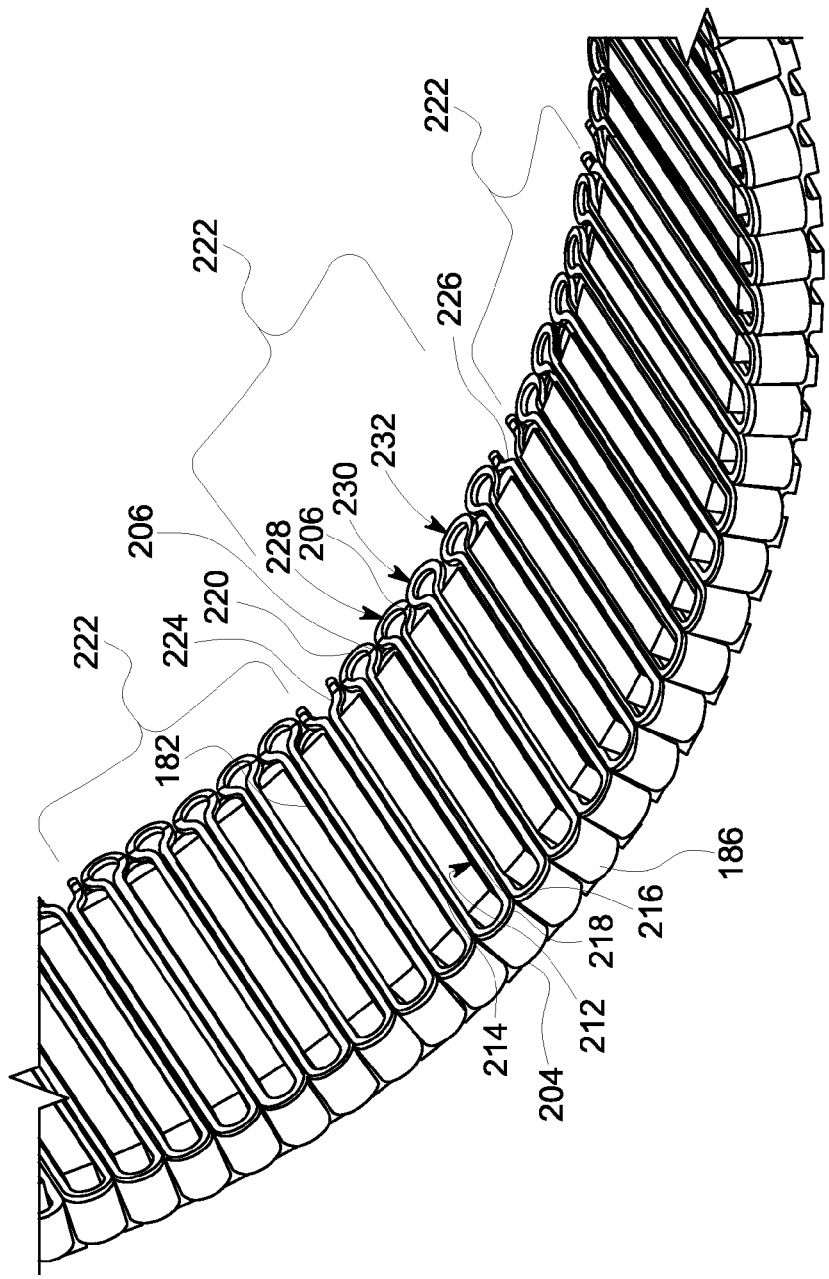
FIG. 6 is a perspective view of exemplary flow members of the cooling assembly coupled to a first side of the coil winding shown in FIG. 5.
Figure 7:
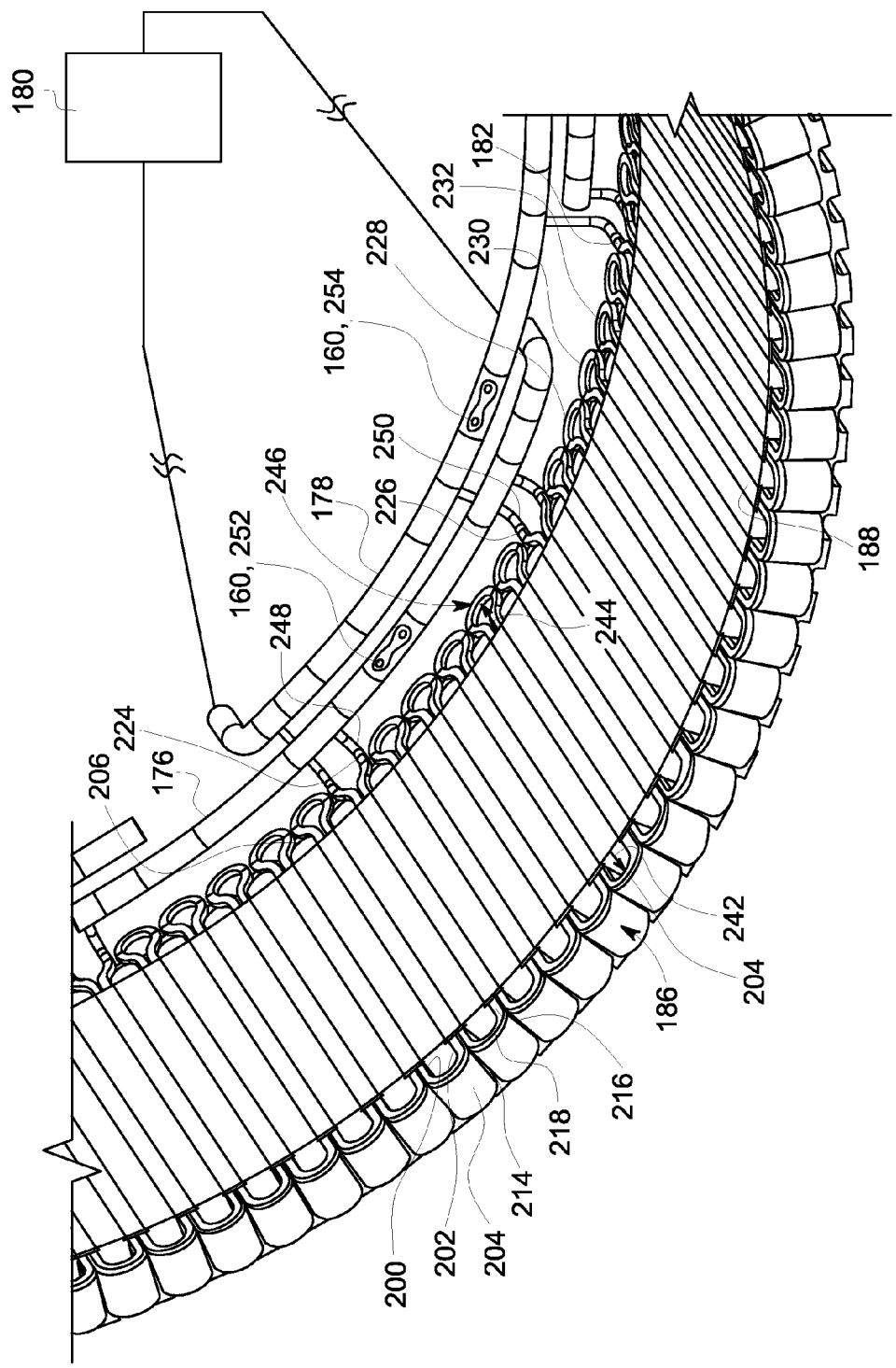
FIG. 7 is a perspective view of a supply header and a return header of the cooling assembly coupled in flow communication to the flow members shown in FIG. 6.

FIG. 6 is a perspective view of flow members 182 coupled to first side 196 (shown in FIG. 4) of coil winding 186. FIG. 7 is a perspective view of supply header 176 and return header 178 of cooling assembly 158 coupled in flow communication to flow members 182. In the exemplary embodiment, flow members 182 are coupled to coil winding 186 in a repeating pattern 212. More particularly, flow members 182 are coupled to coil winding 186 in a serpentine pattern 212. Serpentine pattern 212 is configured to maximize surface contact between flow members 182 and coil windings 186. Moreover, serpentine pattern 212 is configured to minimize and/or eliminate eddy current flow within flow members 182. Alternatively, flow members 182 can be arranged in other patterns such as, but not limited to, non-repeating patterns and sinusoidal patterns. Flow members 182 can include any pattern that enables cooling assembly 158 to function as described herein.

In the exemplary embodiment, each flow member 182 includes a first portion 214, a second portion 216, a first end portion 218 and a second end portion 220. Moreover, flow members 182 are grouped in a plurality of circuits 222 having a pre-determined number of flow members 182. More particularly, each circuit 222 includes six flow members 182 including an inlet flow member 224, an outlet flow member 226 and intermediate flow members 228, 230, 232 between inlet flow member 224 and outlet flow member 226. Alternatively, circuit 222 can include more than six flow members 182 or less than six flow members 182. Circuit 222 can include any number of flow members 182 to enable cooling assembly 158 to function as described herein.

In the exemplary embodiment, first portion 214 is thermally coupled to first coil 200 and second portion 216 is thermally coupled to second coil 202. Moreover, first end portion 218 is thermally coupled to first end turn 204 and second end portion 220 is thermally coupled to second end turn 206. More particularly, second end portion 220 is coupled to second end turn 206 and thermally coupled to adjacent second end turn 206 of circuit 222. For example, second portion 216 of inlet flow member 224 is thermally coupled to second end turn 206 of second coil 202 and to second end turn 206 of adjacent second coil 202.

Moreover, first end portion 218 is coupled in flow communication to first portion 214 and to second portion 216. Second end portion 220 is coupled in flow communication to second portion 216 and adjacent first portion 214 of circuit 222. For example, second end portion 220 of inlet flow member 224 is coupled in flow communication to second portion 216 of inlet flow member 224 and to first portion 214 of adjacent intermediate flow member 228.

In the exemplary embodiment, first end portion 218 has a first radius 242 and second end portion 220 has a second radius 244 which is different than first radius 242. More particularly, first radius 242 is larger than second radius 244. Alternatively, first radius 242 can be substantially the same or smaller than second radius 244. In the exemplary embodiment, at least one of first end portion 218 and second end portion 220 includes a hairpin configuration 246. Alternatively, first and second end portions 218, 220 can include any configuration that enable cooling assembly 158 to function as described herein. First end portion 218 and second end portion 220 are sized and shaped to facilitate efficient flow of cooling agent 160 within first and second end portions 218, 220 and to facilitate efficient flow of cooling agent 160 from flow member 182 to adjacent flow members 182 such as, for example, flow members 228, 230 and 232. Moreover, first and second end portions 218, 220 are sized and shaped to maximize contact surface between first end turn 204 and second end turn 206 respectively to enhance heat transfer between first and second end turns 204, 206 and first and second end portions 218, 220. More particularly, second end portion 220 is sized and shaped to thermally couple to second end turn 206 of one flow member 182 and to second end turn 206 of adjacent flow member 182 of circuit 222.

In the exemplary embodiment, cooling assembly 158 includes a first connecting member 248 and a second connecting member 250. In the exemplary embodiment, first connecting member 248 is coupled in flow communication to supply header 176 and to inlet flow member 224 and connecting member 250 is coupled in flow communication to return header 178 and to outer flow member 226. First connecting member 248 is configured to channel cooling agent 160 from supply header 176 and into inlet flow member 224. Moreover, second connecting member 250 is configured to channel cooling agent 160 from outlet flow member 226 to return header 178. In the exemplary embodiment, first and second connecting members 248, 250 have a circular cross sectional shape to facilitate coupling to supply header 176 and return header 178 respectively. To facilitate coupling to inlet flow member 224 and outlet flow member 226 having a rectangular cross sectional shape, bushings (not shown) may be used. Alternatively, first and second connecting members 248, 250 can include other cross sectional shapes such as, for example, rectangular shapes. First and second connecting members 248, 250 can include any shape that enables cooling assembly 158 to function as described herein. Moreover, first and second connecting members 248, 250 include a non-electrically conductive material which is configured to minimize and/or reduce eddy current flow within flow members 182. More particularly, non-electrically conductive material is configured to electrically isolate flow members 182 from supply header 176 and return header 178.

Heat exchanger 180 is coupled in flow communication to supply header 176 and return header 178. In the exemplary embodiment, supply header 176 is configured to discharge cooling agent 160 at a first temperature 252 from heat exchanger 180 and through first connecting member 248 and into inlet flow member 224. Cooling agent 160 can be discharged under forced flow, for example by a pump (not shown), or under convective flow, for example, thermo-siphon flow. Inlet flow member 224 is configured to discharge cooling agent 160 through first portion 214. Moreover, cooling agent 160 continues to flow from first portion 214, through first end portion 218 and into second portion 216. Second portion 216 is configured to channel cooling agent 160 through second portion 216 and into second end portion 220. Second end portion 220 is configured to channel cooling agent 160 to first portion 214 of adjacent intermediate flow member 228.

Coil winding 186 generates heat which conducts from first coil 200, second coil 202, first end turn 204 and second end turn 206 and conducts to at least one of first portion 214, second portion 216, first end portion 218 and second end portion 220 of each flow member 182. Heat increases the temperature of cooling agent 160 from first temperature 252 to a second temperature 254, wherein first and second coils 200, 202 and first and second end turns 204, 206 are cooled as heat is transferred to cooling agent 160.

Cooling agent 160 continues to flow through first portions 214 and first end portions 218 and through second portions 216 and second end portions 220 of intermediate members 228, 230 and 232 to facilitate heat transfer from coil windings 186 to cooling agent 160. First portion 214 of outlet flow member 226 is configured to channel cooling agent 160 from second end portion 220 of intermediate flow member 232 and through first end portion 218 of outlet flow member 226. Second portion 216 is configured to channel cooling agent 160 from first end portion 218 and into second end portion 220. Second end portion 220 is configured to channel cooling agent 160 into second connecting member 250. Second connecting member 250 is configured to channel cooling agent 160 at second temperature 254 into return header 178 which channels cooling agent 160 through heat exchanger 180. Heat exchanger 180 is configured to change, for example lower, the temperature of cooling agent 160 from second temperature 254 to first temperature 252 to repeat the flow cycle of cooling agent 160 through the pluralities of circuits 22 of flow members 182.

Figure 8:
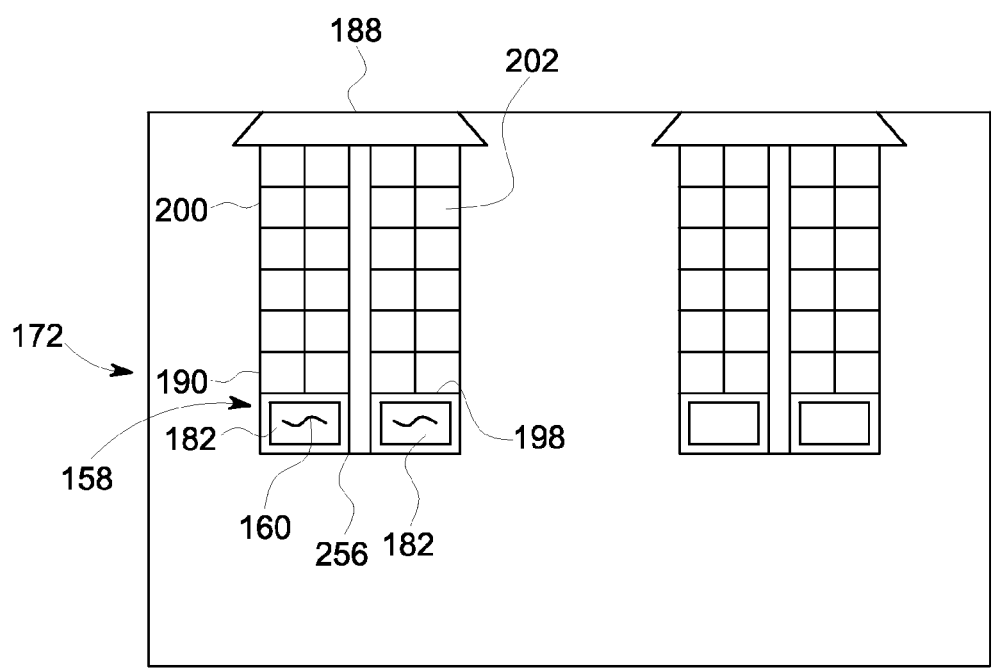
FIG. 8 is another schematic view of the cooling assembly coupled to the stator of the electrical machine shown in FIG. 2.

FIG. 8 is another schematic view of cooling assembly 158 coupled to stator 172. First and second coils 200, 202 are positioned within recess 190, wherein flow members 182 are coupled in thermal communication to first coil 200 and second coil 202 at second side 198. More particularly, flow members 182 are positioned between a recess side 256 and first and second coils 200, 202 wherein wedge 188 is configured to apply pressure against at least first and second coils 200, 202 to facilitate coupling first and second coils 200, 202 at second side 198 to flow members 182. Flow members 182 are configured to channel cooling agent 160 to facilitate heat transfer between first and second coils 200, 202 and flow members 182.

Figure 9:
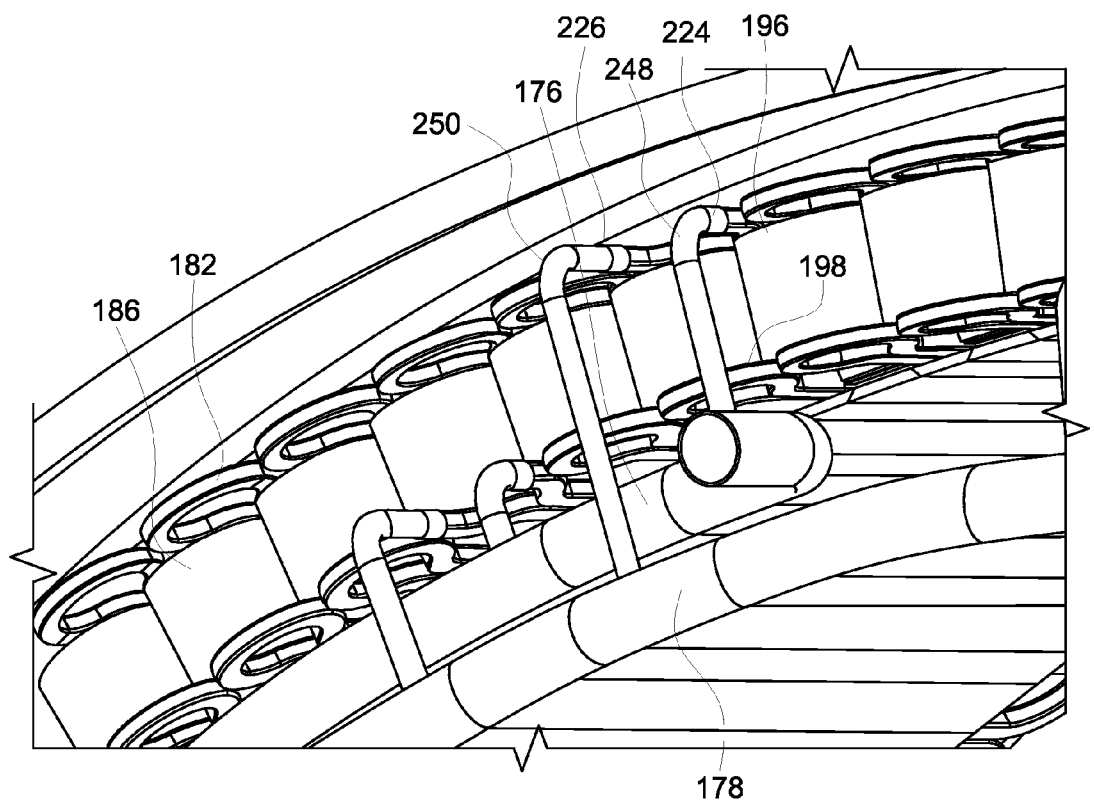
FIG. 9 is a perspective view of the exemplary flow members of the cooling assembly coupled to a second side of the coil winding shown in FIG. 8.

FIG. 9 is another perspective view of flow members 182 coupled to coil winding 186. More particularly, flow members 182 are thermally coupled to at least one of first side 196 and second side 198 of coil winding 186. Moreover, inlet flow members 224 are coupled in flow communication to supply header 176 via first connecting members 248 and outlet flow members 226 are coupled in flow communication to return header 178 via second connecting members 250.

Figure 10:
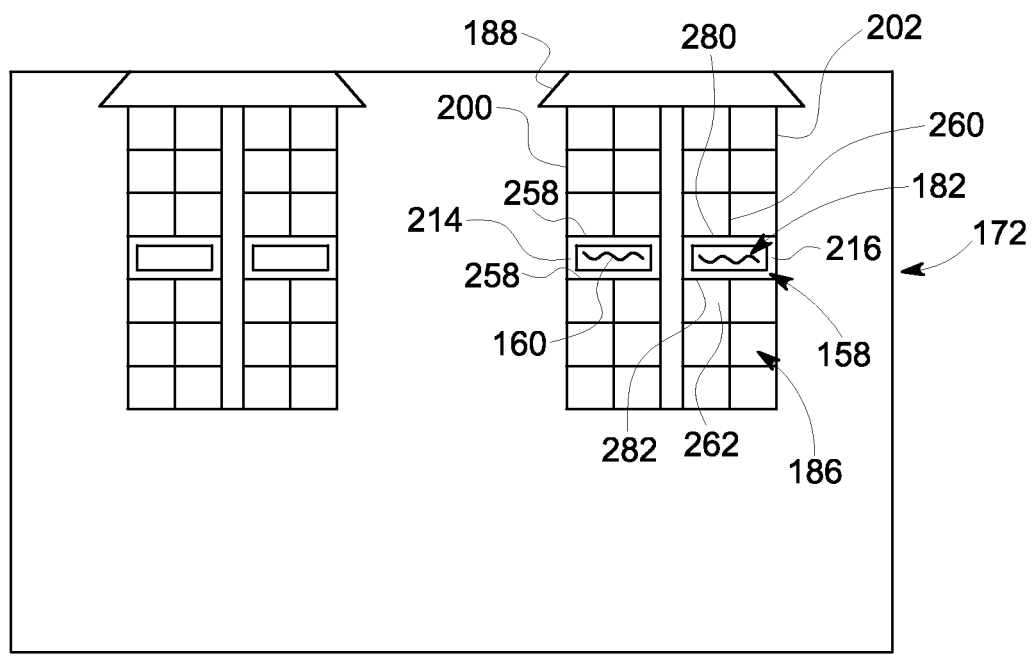
FIG. 10 is another schematic view of the cooling assembly coupled to the stator of the electrical machine shown in FIG. 2.
Figure 11:
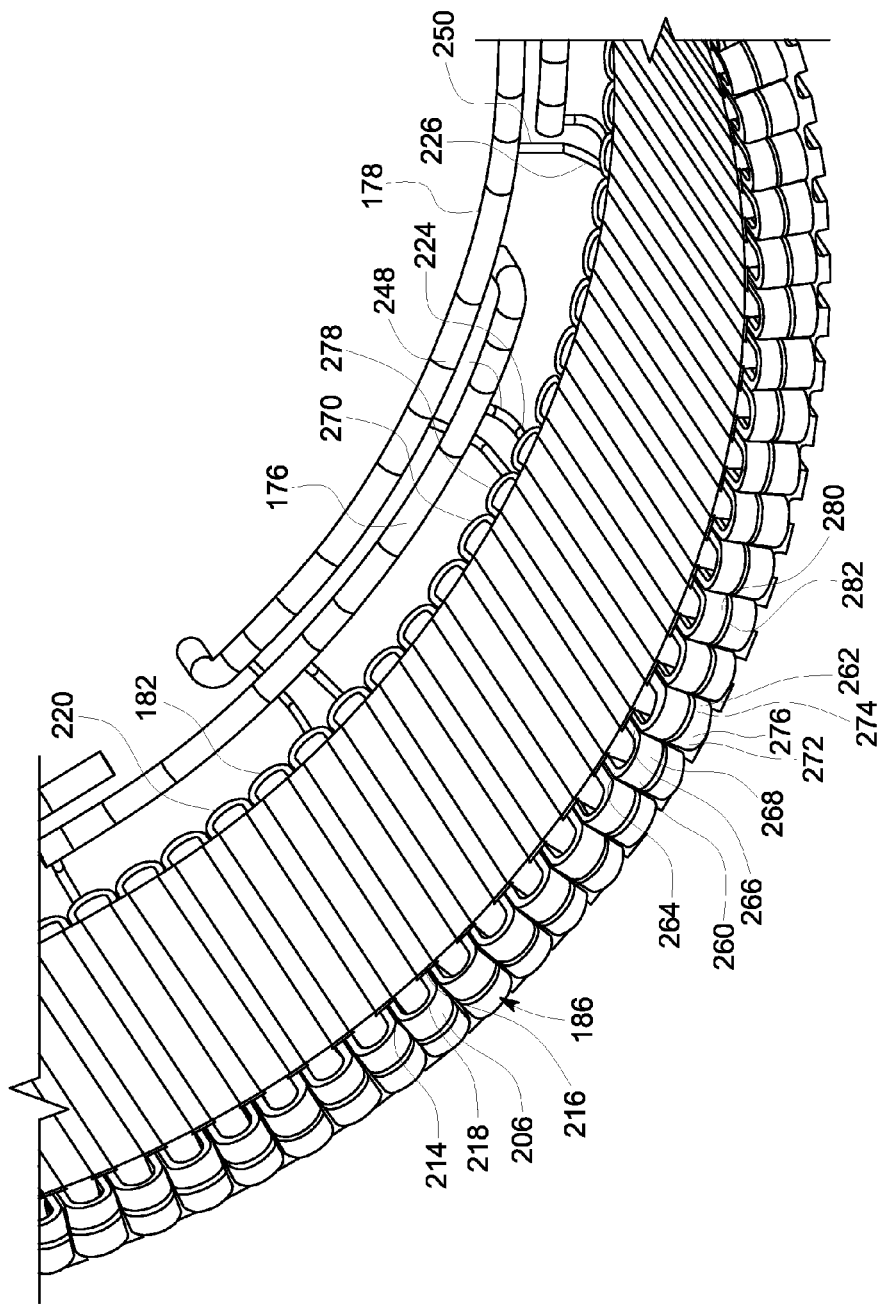
FIG. 11 is a perspective view of the exemplary flow members coupled to a coil winding of the stator shown in FIG. 10.

FIG. 10 is another schematic view of cooling assembly 158 coupled to stator 172. FIG. 11 is a perspective view of flow members 182 coupled to coil winding 186. In the exemplary embodiment, coil winding 186 includes a first coil winding 260 and a second coil winding 262, wherein flow members 182 are positioned between first coil winding 260 and second coil winding 262. Flow members 182 are coupled in thermal communication to internal surfaces 258 of coil winding 186. First portion 214 and second portion 216 are embedded within first and second coils 200, 202 and coupled thereto respectively. Moreover, first and second end portions 218, 220 are embedded within first and second end turns 204, 206 respectively (shown in FIG. 11). Flow members 182 are configured to channel cooling agent 160 to facilitate heat transfer between first and second coils 200, 202 and flow members 182. Wedge 188 is configured to apply pressure to at least first and second coils 200, 202 to facilitate coupling first and second coils 200, 202 to flow members 182.

Moreover, each inlet flow member 224 is coupled in flow communication to supply header 176 via first connecting members 248 and each outlet flow member 226 is coupled in flow communication to return header 178 via second connecting members 250. First coil winding 260 includes a first coil 264, a second coil 266, a first end turn 268 and a second end turn 270. Second coil winding 262 includes a first coil 272, a second coil 274, a first end turn 276 and a second end turn 278. Flow members 182 include a first surface 280 and a second surface 282 wherein first surface 280 is thermally coupled to first coil winding 260 and second surface 282 is coupled to second coil winding 262. More particularly, first surface 280 is coupled to first coil 264, first end turn 268 and second end turn 270. Moreover, second surface 282 is thermally coupled to second coil 274, first end turn 276 and second end turn 278. Since flow members 182 are positioned within and coupled to coil winding 186 and first surface 280 and second surface 282 are thermally coupled to first coil winding 260 and second coil winding 262, first surface 250 and second surface 252 are configured to facilitate increasing surface contact between flow members 182 and first coil winding 260 and second coil winding 262. Moreover, flow members 182 are configured to increase heat transfer between flow members 182 and first coil winding 260 and second coil winding 262.

Figure 12:
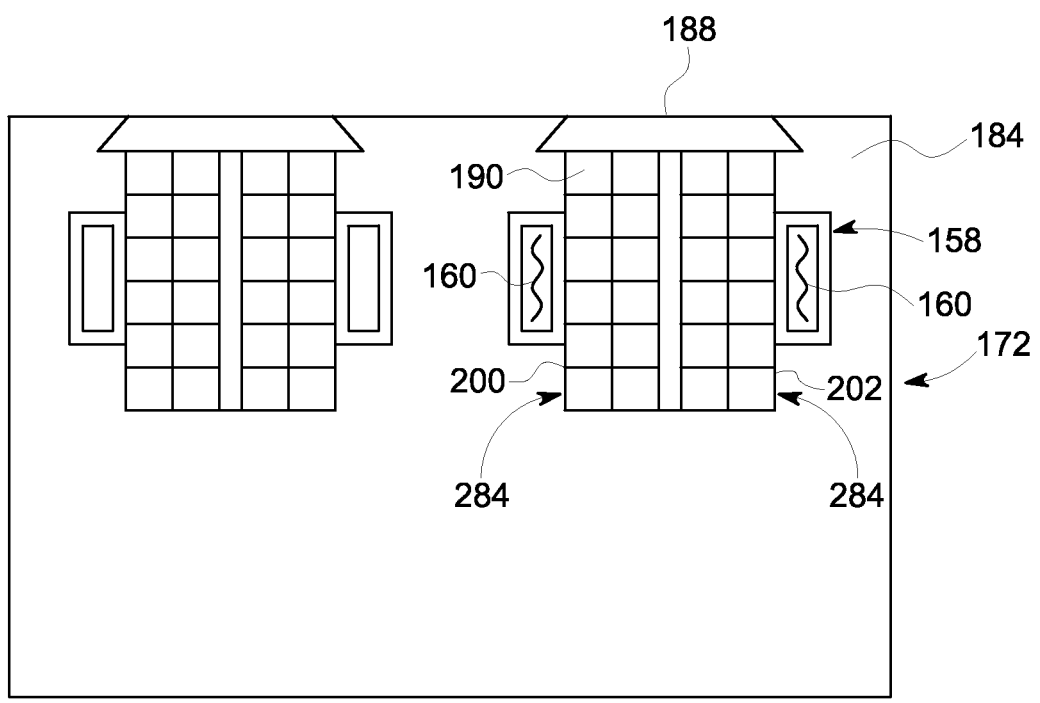
FIG. 12 is another perspective view of the cooling assembly coupled to the stator of the electrical machine shown in FIG. 2.

FIG. 12 is another schematic view of cooling assembly 158 coupled to stator 172. In the exemplary embodiment, flow member 182 is coupled in thermal communication to outer sides 284 of first coil 200 and second coil 202. More particularly, flow members 182 are positioned outside of recess 190 and wedge 188 is configured to apply pressure against first and second coils 200, 202 to facilitate positioning first and second coils 200, 202 within coil former 184. Flow members 182 are configured to channel cooing agent 160 to facilitate heat transfer between first and second coils 200, 202 and flow members 182.

Figure 13:
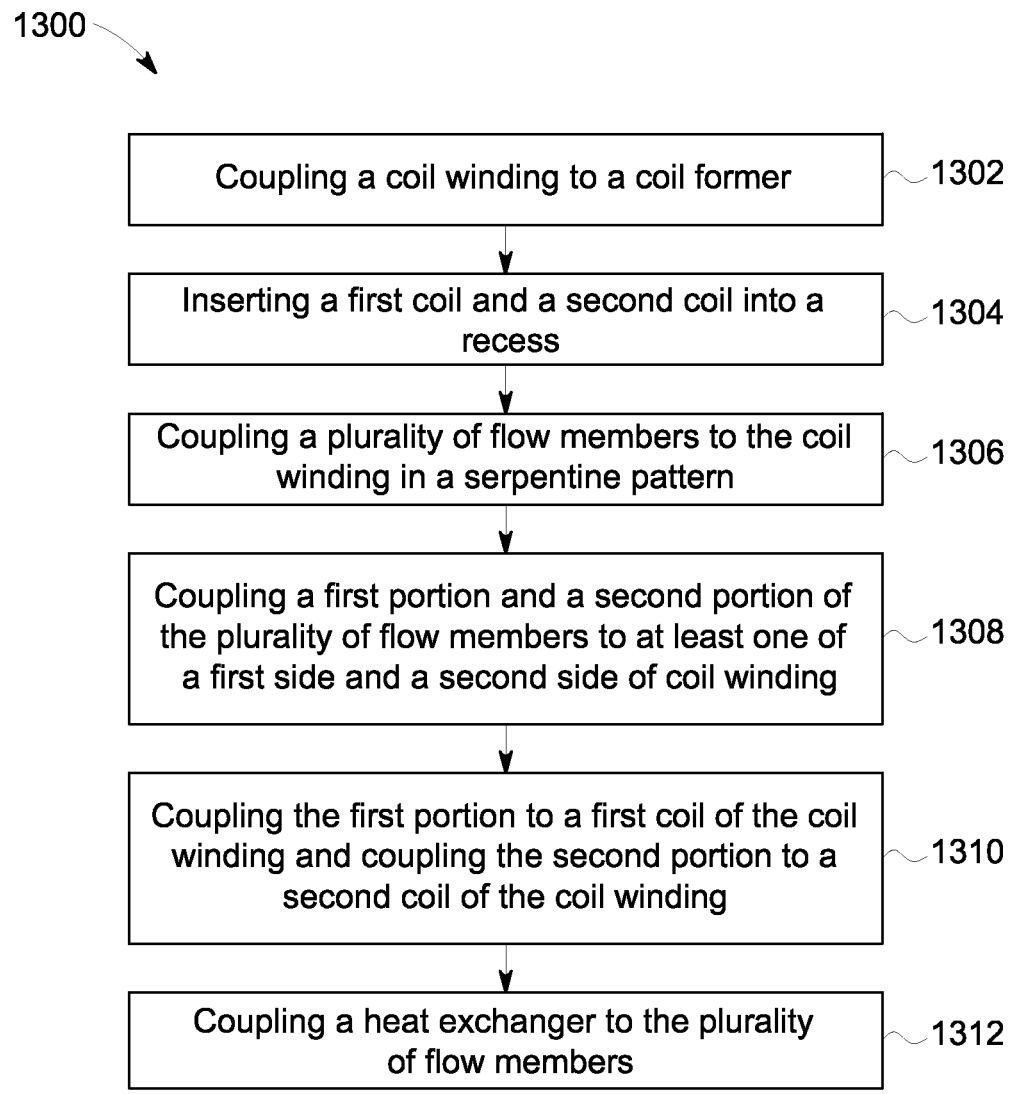
FIG. 13 illustrates an exemplary flowchart illustrating a method of assembling a cooling assembly for an electrical machine.

FIG. 13 illustrates an exemplary flowchart illustrating a method 1300 of assembling a cooling assembly, for example cooling assembly 158 (shown in FIG. 3). The method 1300 includes coupling 1302 a coil winding, for example coil winding 186 (shown in FIG. 5), to a coil former, for example coil former 184 (shown in FIG. 5). In the exemplary embodiment, coil winding includes a first coil, a second coil, a first end turn and a second end turn, for example first coil 200, second coil 202, first end turn 204 and second end turn 206 (shown in FIG. 5). The method 1300 includes inserting 1304 the first coil and the second coil into a recess, such as recess 190 (shown in FIG. 5).

Moreover, the method 1300 includes coupling 1306 a plurality of flow members, for example flow members 182 (shown in FIG. 6), to the coil winding. In the exemplary method, coupling the plurality of flow members to the coil winding includes coupling the flow member in a pattern, for example serpentine pattern 212 (shown in FIG. 6). The flow members include a first portion, a second portion, a first end portion and a second end portion, such as first portion 214, second portion 216, first end portion 218 and second end portion 220 (shown in FIG. 6).

The method 1300 includes coupling 1308 the first portion and the second portion to at least one of a first side and a second side, for example first side 196 and second side 198 (shown in FIGS. 4 and 8), to the coil winding. Moreover, the method 1300 includes coupling 1310 the first portion to the first coil; the second portion to the second coil; the first end portion to the first end turn and the second end portion to the second end turn. The method 1300 includes coupling 1312 a heat exchanger, for example heat exchanger 180 (shown in FIG. 7), to the plurality of flow members.

In the exemplary embodiment, a controller (not shown) can communicatively couple to cooling assembly to control cooling of electrical machine. Due to remote locations of many wind turbines and difficult access to the generator located within nacelle, controller is configured to control cooling assembly during the cooling process. In the exemplary embodiment, a remote operator (not shown) sends a signal (not shown) by any known means to controller to activate cooling assembly to selectively cool the electrical machine.

The embodiments described herein relate to uniform cooling of heat generating components such as stators in electrical machines. The cooling assembly is configured to uniformly cool and maintain temperature profiles around and within stator; reduce cooling power electronically according to external loads; to enable remote control of electrical machine and to remotely monitor system health through thermal response feedback. The cooling assembly includes a compact arrangement of cooling flow members to increase heat transfer from components while reducing the size of cooling assembly. The cooling assembly can include other means of heat transfer such as, for example, heat pipes. The embodiments described herein include flow members which are configured to increase current flow and reduce and/or eliminate eddy current flow. Moreover, the embodiments described herein increase current capacity of the electrical machine while reducing the size of the electrical machine for a given power rating. The smaller electrical machine requires less material and less space.

A technical effect of the systems and methods described herein includes at least one of: an assembly having a supply header; a return header; and a plurality of flow members coupled in flow communication to the supply header and the return header which are configured to channel a flow agent from supply header to the return header; each the flow member of the plurality of flow members includes a first portion coupled to the first coil; a second portion coupled to the second coil; a first end portion coupled to the first end turn and coupled in flow communication to the first portion and the second portion; and a second end portion coupled to the second end turn and coupled in flow communication to the second portion.

Exemplary embodiments of an electrical machine and methods for assembling the electrical machine are described above in detail. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment can be implemented and utilized in connection with many other electrical component applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An assembly for cooling an electrical coil winding having a first coil, a second coil, a first end turn and a second end turn, said assembly comprising:
    a supply header;
    a return header; and
    a plurality of flow members coupled in flow communication to said supply header and said return header and configured to channel a flow agent from supply header to said return header, wherein each said flow member of said plurality of flow members comprises:
        a first portion coupled to the first coil;
        a second portion coupled to the second coil;
        a first end portion coupled to the first end turn and coupled in flow communication to said first portion and said second portion; and
        a second end portion coupled to the second end turn and coupled in flow communication to said second portion;
        wherein at least one of said first end portion and said second end portion comprises a hairpin configuration.

2. The assembly of claim 1, wherein said plurality of flow members are arranged in a serpentine pattern.

3. The assembly of claim 1, wherein each flow member of said plurality of flow member comprises a rectangular cross section.

4. The assembly of claim 1, wherein said first end portion has a first radius and said end second portion has a second radius that is different than said first radius.

5. The assembly of claim 1, wherein an inlet flow member of said plurality of flow members is coupled in flow communication to said supply header and an outlet flow member of said plurality of flow members is coupled in flow communication to said return header.

6. The assembly of claim 1, further comprising an inlet flow member of said plurality of flow members and a first connecting member coupled in fluid communication to said supply header and said inlet flow member.

7. The assembly of claim 6, wherein said first connecting member comprises a non-electrically conductive material.

8. The assembly of claim 1, further comprising an outlet flow member of said plurality of flow members and a second connecting member coupled in fluid communication to said return header and said outlet flow member.

9. The assembly of claim 8, wherein said second connecting member comprises a non-electrically conductive material.

10. The assembly of claim 1, further comprising a heat exchanger coupled in flow communication to said supply header and said return header.

11. An electrical machine comprising:
    a stator comprising a coil former and a coil winding coupled to said coil former, said coil winding comprising a coil, first end turn and a second end turn; and
    a flow assembly coupled to said coil former and comprising:
        a plurality of flow members coupled in flow communication to said coil and configured to channel a flow agent from a supply header to a return header, wherein each said flow member of said plurality of flow members comprises:
            a first portion coupled to said coil;
            a second portion coupled to said coil;
            a first end portion coupled to the first end turn and coupled in flow communication to said first portion and said second portion; and
            a second end portion coupled to the second end turn and coupled in flow communication to said second portion;
            wherein at least one of said first end portion and said second end portion comprises a hairpin configuration.

12. The electrical machine of claim 11, wherein said coil comprises a first side and a second side and said first portion and said second portion are coupled to at least one of said first side and said second side.

13. The electrical machine of claim 11, wherein said coil former comprises a recess and said first portion and said second portion are positioned within said recess.

14. The electrical machine of claim 11, wherein said first portion and said second portion are embedded within said coil.

15. The electrical machine of claim 11, wherein at least one of said first end and said second end comprises a hairpin configuration.

16. The electrical machine of claim 11, wherein said second end turn is coupled to an adjacent coil winding of said stator.

17. An assembly for cooling an electrical coil winding having a first coil, a second coil, a first end turn and a second end turn, said assembly comprising:
    a supply header;
    a return header; and
    a plurality of flow members coupled in flow communication to said supply header and said return header and configured to channel a flow agent from supply header to said return header, wherein each said flow member of said plurality of flow members comprises:
        a first portion coupled to the first coil;
        a second portion coupled to the second coil;
        a first end portion coupled to the first end turn and coupled in flow communication to said first portion and said second portion;
        a second end portion coupled to the second end turn and coupled in flow communication to said second portion; and
    an inlet flow member of said plurality of flow members and a first connecting member coupled in fluid communication to said supply header and said inlet flow member.

18. An assembly for cooling an electrical coil winding having a first coil, a second coil, a first end turn and a second end turn, said assembly comprising:
    a supply header;
    a return header; and
    a plurality of flow members coupled in flow communication to said supply header and said return header and configured to channel a flow agent from supply header to said return header, wherein each said flow member of said plurality of flow members comprises:
        a first portion coupled to the first coil;
        a second portion coupled to the second coil;
        a first end portion coupled to the first end turn and coupled in flow communication to said first portion and said second portion;
        a second end portion coupled to the second end turn and coupled in flow communication to said second portion; and an outlet flow member of said plurality of flow members and a second connecting member coupled in fluid communication to said return header and said outlet flow member.

\* \* \* \* \*